US009274719B2

(12) United States Patent
Eggers et al.

(10) Patent No.: US 9,274,719 B2
(45) Date of Patent: *Mar. 1, 2016

(54) SNAPSHOT MANAGEMENT IN HIERARCHICAL STORAGE INFRASTRUCTURE

(71) Applicant: International Business Machines Corporation, Armonk, NY (US)

(72) Inventors: Martin Eggers, Mainz (DE); Christoph Reichert, Nierstein (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,188

(22) Filed: Aug. 25, 2014

(65) Prior Publication Data

US 2014/0365741 A1      Dec. 11, 2014

Related U.S. Application Data

(63) Continuation of application No. 13/772,863, filed on Feb. 21, 2013.

(51) Int. Cl.
*G06F 3/06* (2006.01)
*G06F 17/30* (2006.01)

(52) U.S. Cl.
CPC .............. *G06F 3/065* (2013.01); *G06F 3/0604* (2013.01); *G06F 3/0683* (2013.01); *G06F 17/302* (2013.01); *G06F 2003/0697* (2013.01)

(58) Field of Classification Search
CPC .......... G06F 17/302; G06F 2003/0697; G06F 3/0604; G06F 3/065; G06F 3/0683
USPC ....................................................... 707/639
See application file for complete search history.

(56) References Cited

U.S. PATENT DOCUMENTS

| 7,389,394 | B1 | 6/2008 | Karr et al. |
| 7,467,266 | B2 | 12/2008 | Burton et al. |
| 7,502,801 | B2 | 3/2009 | Sawdon et al. |
| 7,925,631 | B1 | 4/2011 | Thillai et al. |
| 7,979,395 | B1 | 7/2011 | Aggarwal et al. |

(Continued)

FOREIGN PATENT DOCUMENTS

| WO | 2008127831 A1 | 10/2008 |
| WO | 2008150413 A1 | 12/2008 |
| WO | 2011140025 A1 | 11/2011 |

OTHER PUBLICATIONS

Moh., "Snapshots in a Distributed Persistent Object Storage System", May 2003, pp. 62, Copyright Massachusetts Institute of Technology 2003.

(Continued)

*Primary Examiner* — Jorge A Casanova
(74) *Attorney, Agent, or Firm* — Christopher K. McLane; Daniel R. Simek

(57) ABSTRACT

Embodiments of the present invention disclose a method, computer program product, and system for snapshot management in a storage infrastructure. A computer identifies one or more snapshots within layers of the storage infrastructure. The computer determines one or more relationships of the one or more identified snapshots of the storage infrastructure. The determined relationships include, at least in part, relations of one or more entities included in the one or more snapshots to additional one or more entities in the one or more snapshots of the storage infrastructure. The computer identifies the one or more duplicate snapshots by utilizing the one or more determined relationships of the one or more identified snapshots. The computer consolidates the one or more identified duplicate snapshots in the storage infrastructure. In another embodiment, the computer identifies one or more inconsistent snapshots, and consolidates the one or more inconsistent snapshots in the storage infrastructure.

9 Claims, 3 Drawing Sheets

(56) References Cited

U.S. PATENT DOCUMENTS

| | | |
|---|---|---|
| 8,281,093 B1 | 10/2012 | Krishnan et al. |
| 2005/0163014 A1 | 7/2005 | Soeda |
| 2008/0114951 A1 | 5/2008 | Lee |
| 2008/0162608 A1 | 7/2008 | Torii et al. |
| 2010/0030959 A1 | 2/2010 | Satoyama et al. |

OTHER PUBLICATIONS

Navarro et al., "FuSnap: Fuzzy Control of Logical Volume Snapshot Replication for Disk Arrays", IEEE Transactions on Industrial Electronics, vol. 58, No. 9 Sep. 2011, Copyright 2011 IEEE.

Oppegaard., "Evaluation of Performance and Space Utilisation When Using Snapshots in the ZFS and Hammer File Systems", pp. 1-16, 54, Spring 2009.

Shaull et al., "Skippy: a New Snapshot Indexing Method for Time Travel in the Storage Manager", pp. 637-648, SIGMOD'08, Jun. 9-12, 2008, Vancouver, BC, Canada. Copyright 2008 ACM 978-1-60558-102-6/08/06.

U.S. Appl. No. 13/772,863, entitled "Snapshot Management in Hierarchical Storage Infrastructure", filed Feb. 21, 2013.

List of IBM Patents or Patent Applications Treated as Related, Filed Herewith, Date: Aug. 11, 2015.

SNAPSHOT MANAGEMENT IN HIERARCHICAL STORAGE INFRASTRUCTURE

FIELD OF THE INVENTION

The present invention relates generally to the field of data management, and more particularly to snapshot management in hierarchical storage infrastructure.

BACKGROUND OF THE INVENTION

Information Technology (IT) infrastructure environments can include a hierarchical storage infrastructure which can be used to create and store snapshots in different layers of hierarchical storage infrastructure. IT infrastructure environments utilize servers and server virtualizers in conjunction with storage area networks (SAN) and storage virtualizers to provide the capability to create and manage snapshots. A SAN provides access to consolidated, block level data storage and can be used to make storage devices (i.e. disk arrays) accessible to servers so that the storage devices can appear to be locally attached to the operating system. A snapshot is a usable copy of a defined collection of data that contains an image of how the data appeared at a point in time. In some examples, snapshots may also be referred to as point in time copies. Infrastructure environments are becoming increasingly complex, which leads to an increasing importance of snapshots.

SUMMARY

Embodiments of the present invention disclose a method, computer program product, and system for snapshot management in a storage infrastructure. A computer identifies one or more snapshots within layers of the storage infrastructure. The computer determines one or more relationships of the one or more identified snapshots of the storage infrastructure. The determined relationships include, at least in part, relations of one or more entities included in the one or more snapshots to additional one or more entities in the one or more snapshots of the storage infrastructure. The computer identifies the one or more duplicate snapshots by utilizing the one or more determined relationships of the one or more identified snapshots. The computer consolidates the one or more identified duplicate snapshots in the storage infrastructure. In another embodiment, the computer identifies one or more inconsistent snapshots, and consolidates the one or more inconsistent snapshots in the storage infrastructure.

DETAILED DESCRIPTION

Figure 1:
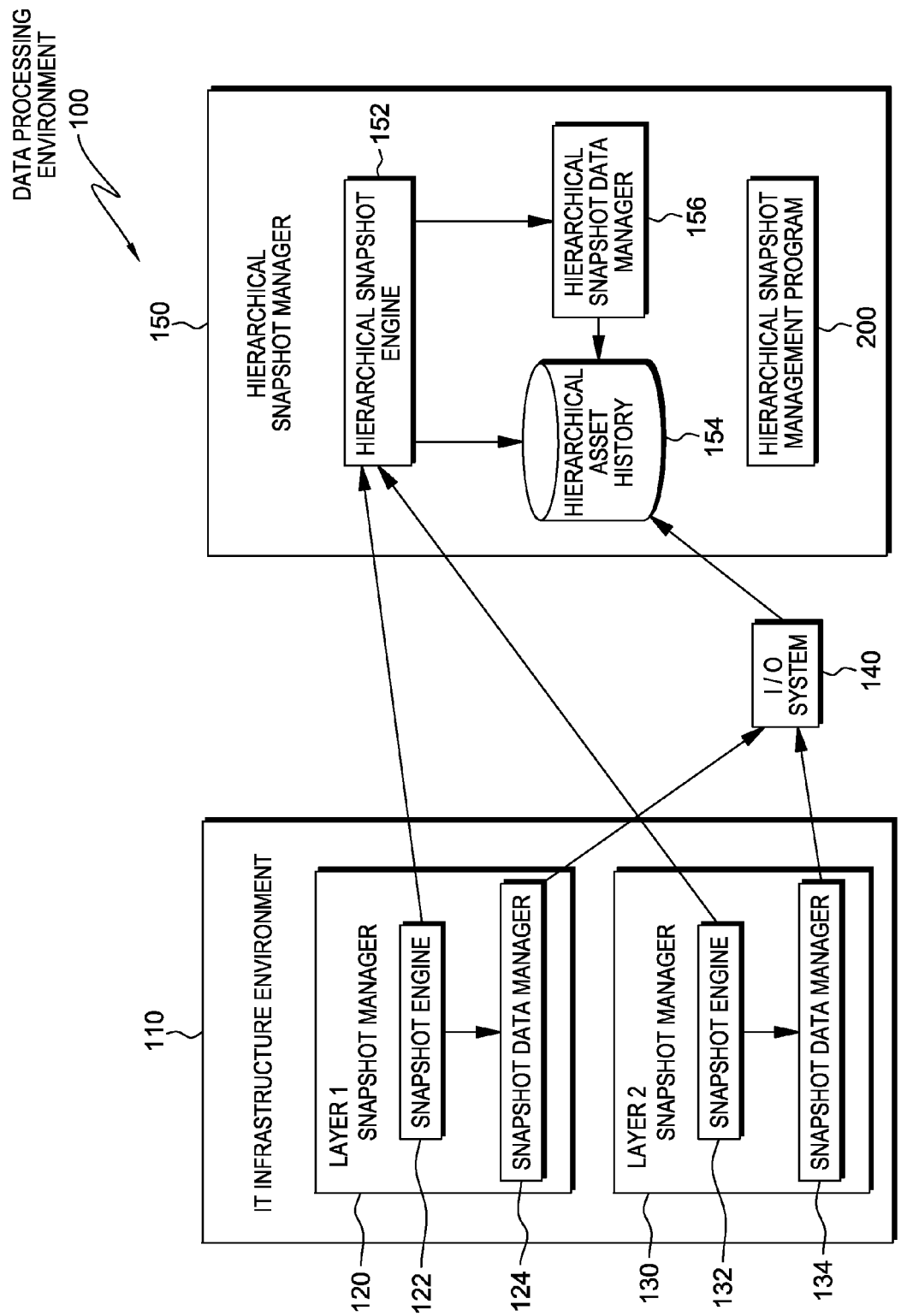
FIG. 1 is a functional block diagram of a data processing environment in accordance with an embodiment of the present invention.

Embodiments of the present invention recognize that multiple copies of the same data in different layers of an IT infrastructure environment wastes space. In an example, snapshots of data in IT infrastructure environments can cause a large amount of repetitive data, which will lead to wasted space. Users and administrators of the IT infrastructure environment may not be aware of existing snapshots throughout the layers of the IT infrastructure environment. In an example, an administrator may take a snapshot of a virtual machine, but is not aware a user has previously taken a snapshot of certain components inside the virtual machine. Also, users and administrators may not be aware of through what means or location snapshot data is stored or protected. Embodiments of the present invention also recognize manually collecting and joining all existing information regarding snapshots in all layers of an IT infrastructure environment can become a time consuming process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

Data processing environment 100 includes IT infrastructure environment 110, I/O system 140, and hierarchical snapshot manager 150. In one exemplary embodiment, IT infrastructure environment 110, I/O system 140, and hierarchical snapshot manager 150 can be desktop computers, specialized computer servers, or any other computer systems known in the art. In certain embodiments, IT infrastructure environment 110, I/O system 140, and hierarchical snapshot manager 150 represent computer systems utilizing clustered computers and components (e.g., database server computers, application server computers, etc.) acting as a single pool of seamless resources when accessed by elements of data processing environment 100. In general, IT infrastructure environment 110, I/O system 140, and hierarchical snapshot manager 150 are representative of any electronic device or combination of electronic devices capable of executing machine-readable program instructions, as described in greater detail with regard to FIG. 3. In one embodiment, IT infrastructure environment 110 includes storage devices organized in a hierarchical structure corresponding to various layers of the IT infrastructure environment. In an embodiment, the elements of data processing environment 100 can communicate through network connections such as a local area network (LAN), a telecommunications network, a wide area network (WAN) such as the Internet, or a combination of the three, and include wired, wireless, or fiber optic connections. In another example, I/O system 140 and hierarchical snapshot manager 150 can be located within IT infrastructure environment 110.

IT infrastructure environment 110 is an exemplary depiction of an environment of a hierarchical storage infrastructure, which includes layer 1 snapshot manager 120 and layer 2 snapshot manager 130. In one embodiment, layer 1 snapshot manager 120 and layer 2 snapshot manager 130 control the creation, deletion and storage of snapshots in IT infrastructure environment 110. Each layer of IT infrastructure environment 110 capable of taking snapshots has a snapshot manager (i.e. layer 1 snapshot manager 120 and layer 2 snapshot manager 130). Layer 1 snapshot manager 120 and layer 2 snapshot manager 130 are instances of snapshot management systems each corresponding to a certain layer of IT infrastructure environment 110. In one embodiment, layer 1 snapshot manager 120 and layer 2 snapshot manager 130 can be representations of the same type of snapshot management system (including the same components) residing on different layers of IT infrastructure environment 110, wherein each snapshot manager includes data corresponding to the layer of IT infrastructure environment that the snapshot manager resides on. In another example, IT infrastructure environment 110 can include more than two layers capable of taking snapshots. In such an example, a snapshot manager can exist on each layer of IT infrastructure environment 110 capable of taking snapshots. In one embodiment, layer 1 snapshot manager 120 includes snapshot engine 122 and snapshot data manager 124, and layer 2 snapshot manager 130 includes snapshot manager 132 and snapshot data manager 134. Snapshot engine 122 and 132 control the snapshot creation and deletion aspects of snapshot manager 120 and 130 respectively. Snapshot data manager 124 and 134 maintain snapshot metadata, and snapshot data corresponding to, at least in part, snapshotted entities in IT infrastructure environment 110, a snapshot time, and a storage location for a snapshot. In one embodiment, snapshot engine 122 and 132 communicate with respective snapshot data managers 124 and 134 to share information about snapshots (i.e. creation and deletion of snapshots), which snapshot data manager can then store.

In one embodiment, I/O system 140 keeps track of snapshot updates of storage entities in the layers of IT infrastructure environment 110, and parent storage entities that correspond to other storage entities in the IT infrastructure environment. I/O system 140 can communicate with snapshot data manager 124 and 134 to share information corresponding to snapshots of entities in IT infrastructure environment 110.

Hierarchical snapshot manager 150 includes hierarchical snapshot engine 152, hierarchical asset history 154, hierarchical snapshot data manager 156 and hierarchical snapshot management program 200. In one embodiment, hierarchical snapshot manager 150 can access snapshots and snapshot information throughout all layers of IT infrastructure environment 110. Hierarchical snapshot engine 152 is responsible for controlling the migration of snapshots throughout the layers of IT infrastructure environment 110. Hierarchical snapshot engine 152 can communicate with snapshot engine 122 and 132 to perform snapshot configuration changes, such as deleting, creating, or restoring snapshots. In one embodiment, hierarchical asset history 154 is a database for collecting and storing information corresponding to all snapshots from all snapshot managers (i.e. layer 1 snapshot engine 120 and layer 2 snapshot engine 130) in IT infrastructure environment 110. The snapshot information in hierarchical asset history 154 includes, at least in part, a layer in IT infrastructure environment 110 corresponding to the snapshot, snapshot size, snapshot time, and snapshot storage information. Hierarchical asset history 154 can be implemented with any type of database storage capable of storing data which may be accessed and utilized by elements of IT infrastructure environment 110, and I/O system 140, such as a database server, a hard disk drive, or flash memory. In an embodiment, layer 1 snapshot manager 120 or layer 2 snapshot manager 130 can notify hierarchical asset history 154 of changes to snapshot information through communication with I/O system 140. Hierarchical snapshot engine 152 can communicate with hierarchical asset history 154 in order to reflect actions taken by the hierarchical snapshot engine. In one embodiment, hierarchical snapshot engine 152 can communicate with hierarchical asset history 154 and hierarchical snapshot data manager 156 to utilize snapshot information to identify redundant, overlapping, and inconsistent snapshots hierarchical snapshot management program 200 can remove or migrate within IT infrastructure environment 110. Hierarchical snapshot data manager 156 manages copies of snapshot metadata for utilization in hierarchical snapshot manager 150. In one embodiment, hierarchical snapshot data manger 156 analyzes and correlates snapshot information from hierarchical asset history 154. Hierarchical snapshot data manager 156 can communicate with hierarchical asset history 154 to analyze snapshot information to determine duplicate snapshots and inconsistent snapshots stored in hierarchical asset history. Hierarchical snapshot manager 150 utilizes hierarchical snapshot management program 200 to migrate and consolidate snapshots stored in IT infrastructure environment 110. Hierarchical snapshot management program 200 is discussed in greater detail with regard to FIG. 2.

Figure 2:
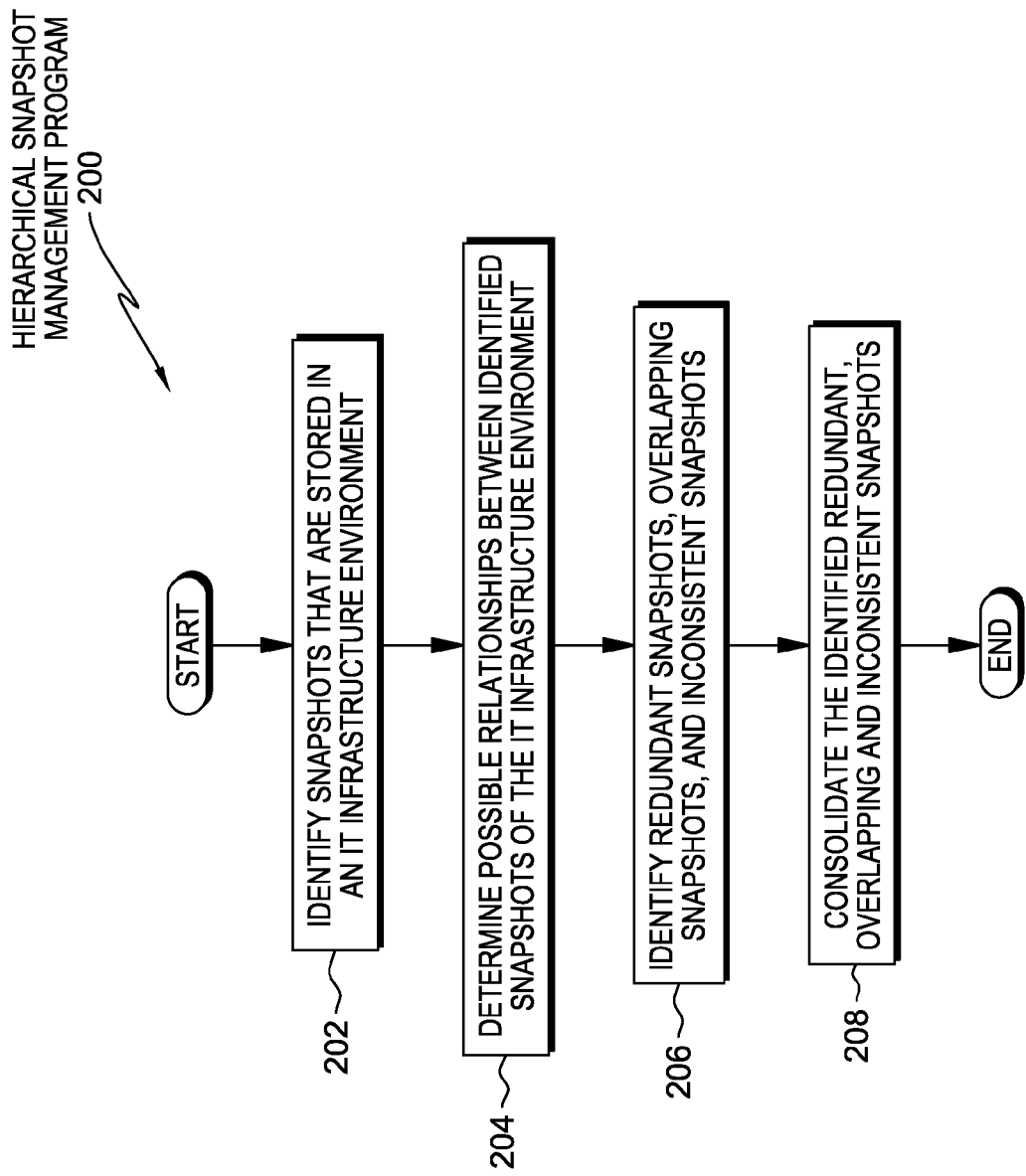
FIG. 2 is a flowchart depicting operational steps of a program for migrating and consolidating snapshots in an IT infrastructure environment, in accordance with an embodiment of the present invention.

FIG. 2 is a flowchart depicting operational steps of hierarchical snapshot management program 200 in accordance with an exemplary embodiment of the present invention.

In step 202, hierarchical snapshot management program 200 identifies snapshots stored in an IT infrastructure environment. In one embodiment, hierarchical snapshot management program 200 accesses snapshot managers (i.e. layer 1 snapshot engine 120 and layer 2 snapshot engine 130) on layers of IT infrastructure environment 110 in order to identify snapshots. In an example, hierarchical snapshot management program 200 accesses layer 1 snapshot manager 120 to identify the snapshots existing on layer 1 of IT infrastructure environment 110, and the snapshot information corresponding to each snapshot. The snapshot information can include at least in part the snapshot size, the creation time of the snapshot, and the storage method and location of the snapshot. In this example, hierarchical snapshot management program 200 continues to access other layers of IT infrastructure environment 110, and identifies existing snapshots, and corresponding snapshot information. In one embodiment, snapshot management program 200 determines relationships of snapshots in every layer of IT infrastructure environment 110, even layers that do not include a snapshot manager.

In step 204, hierarchical snapshot management program 200 determines possible relationships between identified snapshots of the IT infrastructure environment. In one embodiment, hierarchical snapshot management program 200 utilizes the snapshots identified in step 202 and determines the possible snapshot relationships to IT infrastructure environment 110. In an example, hierarchical snapshot management program 200 accesses snapshot data manager 124 and 134 and utilizes snapshot metadata to determine relationships. The relationships hierarchical snapshot management program 200 determines include entities of IT infrastructure environment 110 included in each snapshot, wherein the entities of the IT infrastructure environment can include storage elements, elements capable of creating snapshots, or other elements of the IT infrastructure environment. Data collection by hierarchical snapshot management program 200 can include all layers and elements of IT infrastructure environment 110 having snapshots. In an example, hierarchical snapshot management program 200 identifies and correlates relationship data for snapshots corresponding to snapshots of layer 1 snapshot manager 120 with a corresponding storage structure (i.e. virtual storage locations, separate physical disc storage) within IT infrastructure environment 110. In this example, hierarchical snapshot management program 200 repeats the identifying and correlating process for each layer of IT infrastructure database 110. In one embodiment, relationship information that hierarchical snapshot management program 200 uses to correlate the storage structure includes, but is not limited to, snapshotted entities, layers that snapshotted entities relate to, parent entities of snapshotted entities, snapshots including a certain entity, and snapshot timestamps. A parent entity of a snapshotted entity can be an entity within IT infrastructure environment 110 that containing or controlling the snapshotted entity as a subsidiary. In various embodiments, parent entities have one or more corresponding child entities. In examples with regard to IT infrastructure environment 110, a snapshotted entity can have a relationship with a parent entity, wherein the parent entity contains the storage location of the snapshotted entity, or can control the actions of the snapshotted entity. In some examples, determined relationships can relate to, layers of IT infrastructure environment 110 that store identified snapshots, entities of the IT infrastructure environment included in snapshots, relationships of snapshots to parent entities, snapshot timestamps, and snapshot storage locations. The collection of determined relationships of existing snapshots results in a hierarchical organization of the entities of IT infrastructure environment 110.

In step 206, hierarchical snapshot management program 200 identifies redundant snapshots, overlapping snapshots, and inconsistent snapshots. In one embodiment, hierarchical snapshot management program 200 utilizes snapshot metadata, snapshot information and relationship data to identify redundant, overlapping, or inconsistent snapshots identified in step 202. Hierarchical snapshot management program 200 considers snapshots to be redundant when a snapshot includes a parent entity that has a relationship with another snapshot. In an example, a redundant snapshot can be a snapshot including a storage device, wherein the storage device contains another snapshot. Hierarchical snapshot management program 200 considers snapshots to be overlapping when separate snapshots exist of an entity, and its parent entity. In an example, if a snapshot of a portion of a storage device and a snapshot of the entire storage device exist, then the snapshots are overlapping. Hierarchical snapshot management program 200 considers snapshots to be inconsistent when a snapshotted entity has multiple parent entities, but for one or more of the parent entities of the snapshotted entity, a snapshot does not exist, or the snapshots of the parent entities are not taken simultaneously (i.e. do not have the same timestamps).

In step 208, hierarchical snapshot management program 200 consolidates the identified redundant, overlapping, and inconsistent snapshots. In one embodiment, hierarchical snapshot management program 200 consolidates snapshots by migrating snapshots and snapshot data, and removing unnecessary snapshot data. Snapshots and snapshot data migration can occur between different layers of IT infrastructure environment 110 in order to optimize the placement of snapshots throughout the IT infrastructure environment. In one embodiment, hierarchical snapshot management program 200 can migrate snapshots to parent entities and layers of IT infrastructure environment 110. For example, hierarchical snapshot management program 200 can migrate snapshots stored in storage devices on various layers of IT infrastructure environment 110 to a single parent layer. In exemplary embodiments, hierarchical snapshot management program 200 optimizes the placement of snapshots throughout IT infrastructure environment 110 by placing snapshots in certain layers of the IT infrastructure environment, minimizing storage space and complexity and providing an increase in data security. In one embodiment, hierarchical snapshot management program 200 compares data of redundant, overlapping or inconsistent snapshots to determine if snapshots are different from one another. Hierarchical snapshot management program 200 can remove the identical portions of the snapshots in order to consolidate the snapshots so that the snapshots are no longer redundant, overlapping or inconsistent. In one embodiment, hierarchical snapshot management program 200 consolidates the redundant, overlapping and inconsistent snapshots by generating updated snapshots not including unnecessary or repetitive information, and removes snapshots having or including unnecessary or repetitive information. In another embodiment, hierarchical snapshot management program 200 can output a report detailing the identified redundant, overlapping and inconsistent snapshots. In an exemplary embodiment, hierarchical snapshot management program 200 identifies the inconsistent snapshots (i.e. in a report), and allows for removal of the identified inconsistent snapshots.

In an example, multiple snapshots in a certain area of IT infrastructure environment 110 exist and have been taken at different times. In such an example, a migration of the snapshots begins by assigning the oldest snapshot to a storage virtualizer of IT infrastructure environment 110 where hierarchical snapshot management program 200 creates and migrates a copy of the oldest snapshot to a storage device within IT infrastructure environment. The migrated copy of the oldest snapshot has a timestamp indicating the time the oldest snapshot was created, not when the copy was created. Once hierarchical snapshot management program 200 creates and migrates a copy of a snapshot, the original snapshot can be deleted. In this example, hierarchical snapshot management program 200 migrates a newer snapshot (a snapshot in the same area of IT infrastructure environment 110, but created at a later time) by assigning the newer snapshot to a storage virtualizer and associating the newer snapshot with the migrated copy of the oldest snapshot. Hierarchical snapshot management program 200 determines differential data between the newer snapshot and the migrated copy of the oldest snapshot, and data from the newer snapshot not included in the migrated copy of the oldest snapshot is added to the migrated copy of the oldest snapshot to create an updated snapshot. The updated snapshot has a timestamp indicating the time at which the newer snapshot was created. Since hierarchical snapshot management program 200 utilizes differential data between the oldest snapshot and the newest snapshot to create the updated current snapshot, the newer snapshot can be deleted. The migration process repeats for all snapshots (oldest to newest), and the result is hierarchical snapshot management program 200 generating a current snapshot for the certain area of IT infrastructure environment 110 from all previous snapshots of that area that hierarchical snapshot management program can update with subsequent snapshots.

Figure 3:
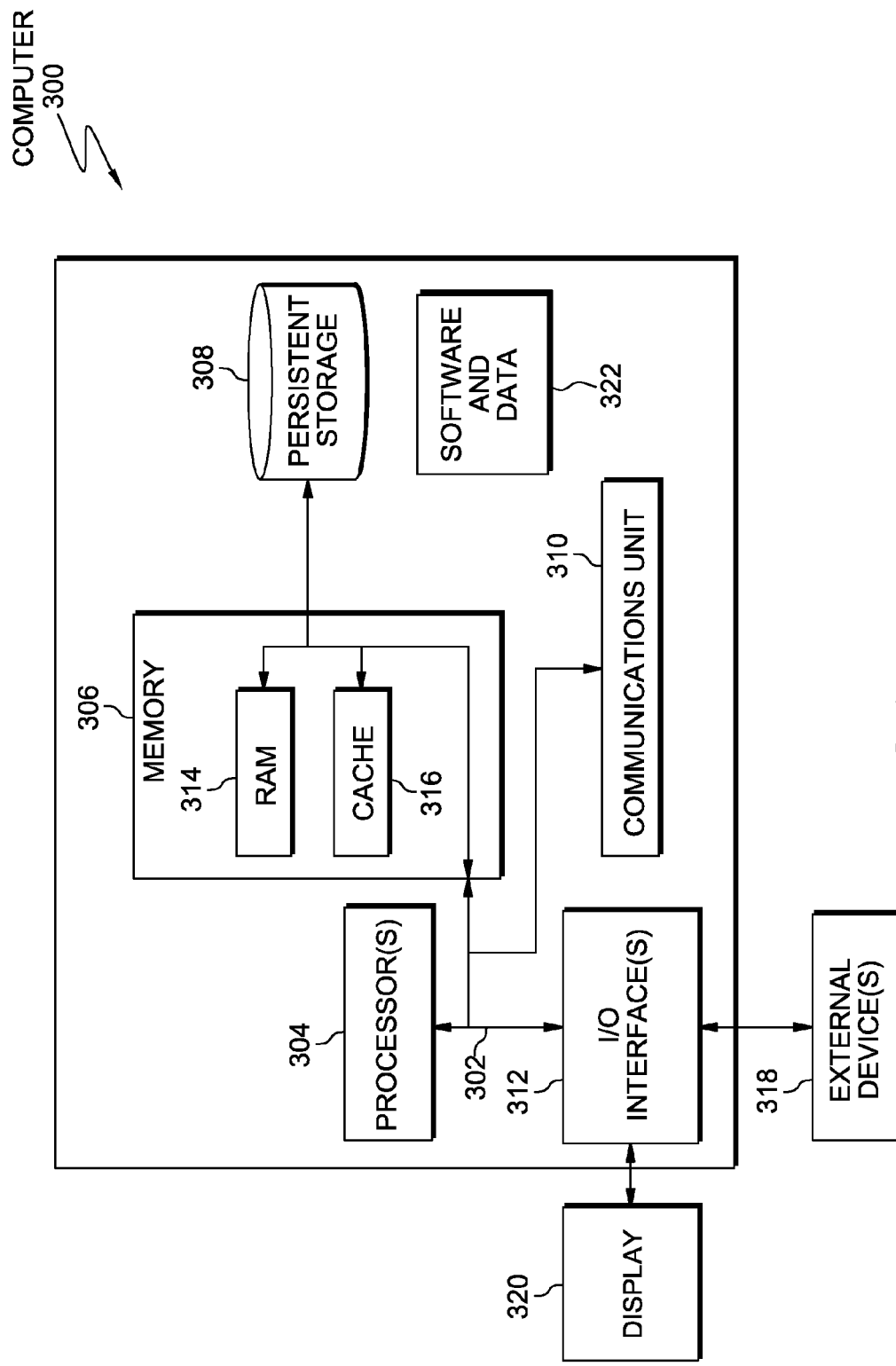
FIG. 3 depicts a block diagram of components of the computers of FIG. 1 in accordance with an embodiment of the present invention.

FIG. 3 depicts a block diagram of components of computer 300, which is representative of IT infrastructure environment 110, I/O system 140, and hierarchical snapshot manager 150, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media. Software and data 322 stored in persistent storage 308 for access and/or execution by processor(s) 304 via one or more memories of memory 306. With respect to hierarchical snapshot manager 150, software and data 322 includes hierarchical snapshot management program 200.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for snapshot management in a storage infrastructure, the method comprising the steps of:
   a computer identifying one or more snapshots within layers of the storage infrastructure;
   the computer determining one or more relationships of the one or more identified snapshots of the storage infrastructure, wherein the relationships at least in part include relations of one or more entities included in the one or more snapshots to additional one or more entities in the one or more snapshots of the storage infrastructure;
   the computer identifying one or more parent entities for a snapshot entity utilizing the one or more determined relationships of the one more identified snapshots;
   the computer determining that for one or more of the parent entities a snapshot does not exist; and
   the computer removing the snapshot entity with the identified one or more parent entities that are determined to not have an existing snapshot.

2. The method of claim 1, further comprising the steps of:
   the computer identifying one or more duplicate snapshots utilizing the one or more determined relationships of the one or more identified snapshots; and
   the computer consolidating the one or more identified duplicate snapshots.

3. The method of claim 2, wherein the one or more identified duplicate snapshots include one of the one or more snapshots including an entity containing another of the one or more snapshots, and the one of the one or more snapshots and the another of the one or more snapshots are substantially similar.

4. The method of claim 2, wherein said removing the one or more identified duplicate snapshots and the one or more identified inconsistent snapshots, further comprises the step of:
   the computer migrating the one or more identified duplicate snapshots and the one or more identified inconsistent snapshots throughout layers of the storage infrastructure in order to optimize placement of the one or more identified duplicate snapshots and the one or more identified inconsistent snapshots in the storage infrastructure.

5. The method of claim 4, further comprising the steps of:
   the computer identifying repetitive information in the one or more identified duplicate snapshots and the one or more identified inconsistent snapshots; and
   the computer generating one or more new snapshots without the repetitive information.

6. The method of claim 1, wherein removing the one or more identified inconsistent snapshots comprises:
   the computer migrating snapshots and snapshot data; and
   the computer removing unnecessary snapshot data.

7. The method of claim 6, wherein removing the one or more identified inconsistent snapshots, comprise the computer creating a report of the inconsistent snapshots.

8. A method for snapshot management in a storage infrastructure, the method comprising:
   identifying, by one or more computer processors one or more snapshots within layers of the storage infrastructure;
   determining, by one or more computer processors, one or more relationships of the one or more identified snapshots of the storage infrastructure, wherein the relationships at least in part include relations of one or more entities included in the one or more snapshots to additional one or more entities in the one or more snapshots of the storage infrastructure;
   identifying, by one or more computer processors, one or more parent entities for a snapshot entity utilizing the one or more determined relationships of the one more identified snapshots;
   determining, by one or more computer processors, that for one or more of the parent entities a snapshot of the one or more parent entities was not taken simultaneously; and
   removing, by one or more computer processors, the snapshot entity with the identified one or more parent entities that are determined to correspond to a snapshot not taken simultaneously.

9. A method for snapshot management in a storage infrastructure, the method comprising:
   identifying, by one or more computer processors, one or more snapshots within layers of the storage infrastructure;
   determining, by one or more computer processors, one or more relationships of the one or more identified snapshots of the storage infrastructure, wherein the relationships at least in part snapshotted entities, layers that snapshotted entities relate to, parent entities of snapshotted entities, snapshots including a certain entity, and snapshot timestamps;
   identifying, by one or more computer processors, one or more duplicate snapshots utilizing the one or more determined relationships of the one more identified snapshots;
   determining, by one or more computer processors, that for one or more of the parent entities a snapshot of the one or more parent entities was not taken simultaneously; and
   removing, by one or more computer processors, the snapshot entity with the identified one or more parent entities that are determined to correspond to a snapshot not taken simultaneously.

* * * * *